Dec. 3, 1968  J. D. BISHOP ETAL  3,414,801
INVERTER SYMMETRY CORRECTION CIRCUIT
Filed April 25, 1967  2 Sheets-Sheet 1
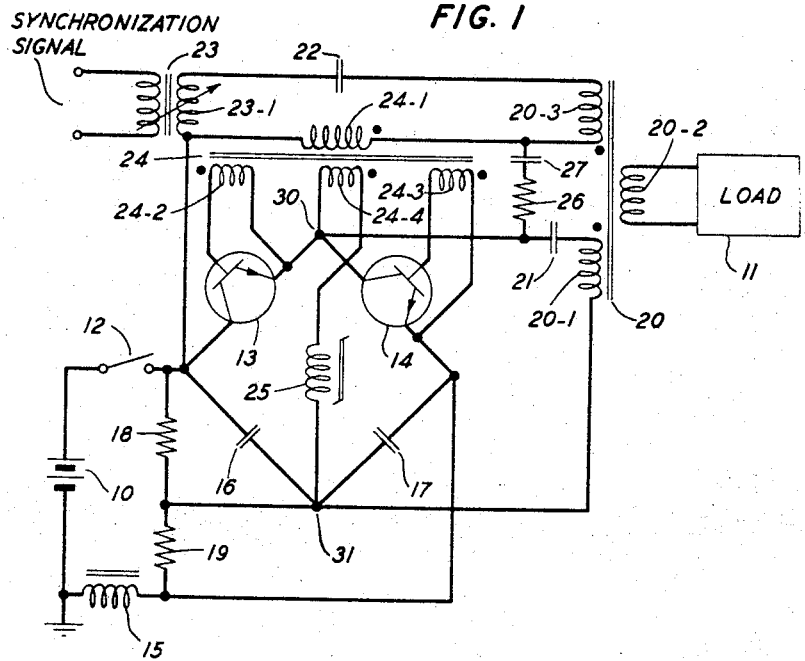
FIG. 1
FIG. 2
A - L25 CORRECTION CURRENT 
B - R26/C27 CORRECTION CURRENT 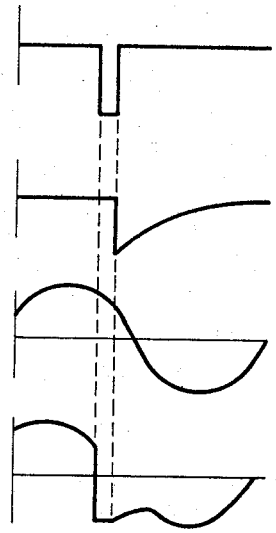
C - SINUSOIDAL DRIVE CURRENT
D - COMPOSITE DRIVE CURRENT 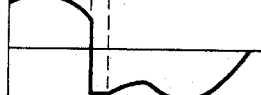
INVENTORS: J. D. BISHOP
J. W. IANNIELLO
BY R. B. Ardis
ATTORNEY United States Patent Office 3,414,801
Patented Dec. 3, 1968

3,414,801
INVERTER SYMMETRY CORRECTION CIRCUIT
John D. Bishop, Basking Ridge, and Joseph W. Ianniello, Morristown, N.J., assignors to Bell Telephone Laboratories, Incorporated, Berkeley Heights, N.J., a corporation of New York
Filed Apr. 25, 1967, Ser. No. 633,448
5 Claims. (Cl. 321—16)

ABSTRACT OF THE DISCLOSURE

In a bridge type inverter a saturable core inductor is connected between the output diagonals of the bridge through an auxiliary winding of the switching transistor drive transformer and a series R–C network is connected between the drive transformer primary winding and one of the output diagonals to induce symmetry correction signals in the drive transformer, thereby assuring a symmetrical output waveform of the inverter.

Background of the invention

This invention relates generally to transistor inverters and, more specifically, to transistor inverter symmetry correction circuits.

Inverters are generally used in direct current converters to change a direct current input to an alternating current wave which can then be readily transformed to a different voltage level to be rectified and filtered to provide a steady direct current output.

One commonly used inverter makes use of a pair of alternately conducting transistors connected to pass current from the direct current source to the load in respectively opposite directions. A positive feedback path is provided from the inverter output to the emitter-base paths of the switching transistors to maintain continuous operation. Transformer saturation characteristics, separate timing components in the positive feedback path, or a combination of both, control the switching frequency of the transistors and, hence, the frequency of the alternating current output wave.

In order to increase the operating efficiency of such inverters, it is highly desirable that the output waveform is maintained symmetrical at all times. To provide for such symmetrical operation it has heretofore been necessary to incorporate into inverters complex circuitry which, in addition to its complexity, generally dissipates large quantities of energy, thereby partially negating the primary purpose of the symmetry circuit.

The primary object of the invention is to provide for a symmetrical transistor inverter output waveform in as simple and as efficient a manner as possible.

A further object of the invention is to simplify symmetry correction circuitry in transistor inverters.

Summary of the invention

To fulfill these objects, the invention includes in an inverter the series combination of a saturable core inductor and an auxiliary winding of the switching transistor drive transformer to generate the required symmetry correction signals in order to assure symmetrical operation of the inverter.

More specifically, in accordance with one feature of the invention the series combination of a saturable core inductor and an auxiliary winding of the switching transistor drive transformer is connected between the juncture of the switching transistors and the juncture of the capacitors of a half-bridge type inverter. As the output waveform of the inverter becomes symmetrical, the average voltage across the saturable core inductor changes from zero to some value proportional to the voltage imbalance. As a result of this voltage difference across and in conjunction with the saturation characteristics of the saturable core inductor, a symmetry correction signal is induced in the switching transistor drive transformer. This correction signal tends to control the conduction period of the switching transistors to provide for a symmetrical output waveform of the inverter.

In some inverter applications, however, which incorporate the present invention and where the inverter switching frequency is determined by a tuned tank circuit in the feedback path, for instance, the output waveform imbalance as related to the sinusoidal drive signal from the tank circuit may be so great that the correction signal obtained from the saturable core inductor is by itself insufficient to maintain the output waveform symmetrical. In accordance with another feature of the invention a series R–C network is therefore added between the juncture of the switching transistors and the primary winding of the switching transistor drive transformer to generate an additional correction component, thereby assuring the effectiveness of the symmetry correction. That is, the combination of the correction signal derived from the saturable core inductor and the correction signal obtained from the R–C network is of the required form and duration to effectively provide for a symmetrical inverter output waveform.

A particularly important feature of the invention is the low power requirement of the symmetry correction arrangement. That is, since the symmetry correction action takes place in the base drive circuits of the switching transistors, only a minimal amount of additional power is dissipated, thereby rendering the arrangement in addition to its simplicity efficient and economical.

In another embodiment of the invention two half-bridge inverters are connected in parallel, with the first bridge operating as a free running inverter to drive the second bridge which may be used as the power stage. While the first bridge is identical to the embodiment of the invention previously described, the second bridge comprises two additional transistors having their emitter-collector paths connected in series across the two capacitor legs of the first bridge, whereby the second bridge shares the two capacitors of the first bridge. As a result of the parallel connection of the two bridges, the saturable core inductor is now responsive to the voltage imbalance caused by the asymmetry of the output waveforms of both the first and the second bridge, thereby considerably enhancing the sensitivity and effectiveness of the symmetry correction arrangement.

Brief description of the drawings

FIG. 1 is a schematic diagram of a specific embodiment of the invention in an inverter that utilizes a tuned circuit to determine its operating frequency;

FIG. 2, lines A through D, illustrates the operation of the embodiment of FIG. 1.

Detailed description

Figure 3:
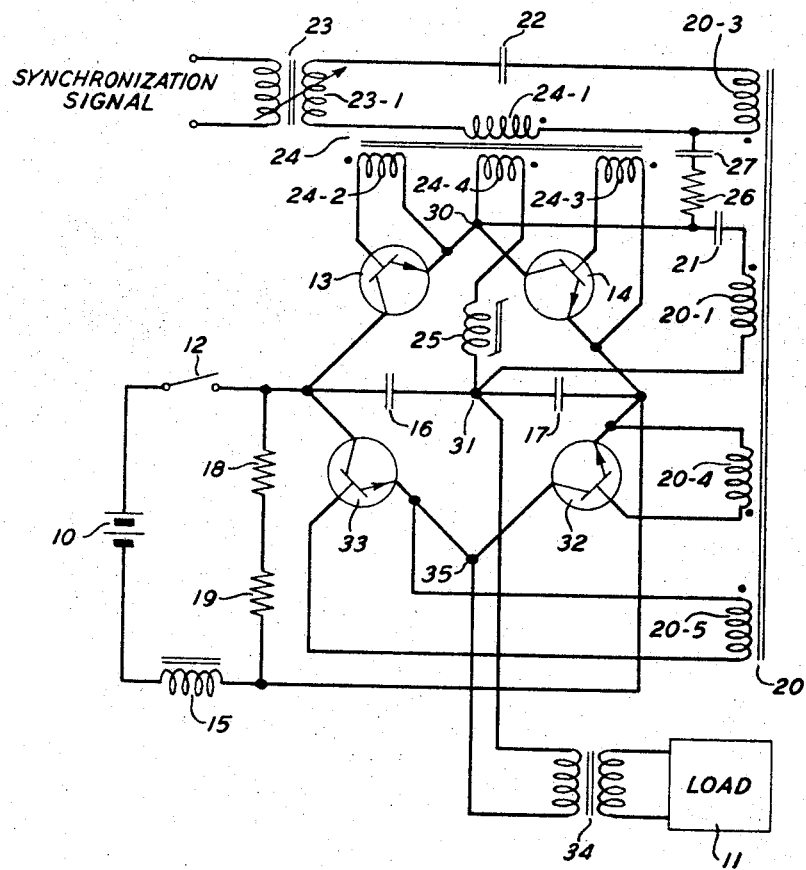
FIG. 3 is a schematic diagram of another embodiment of the invention in an inverter which utilizes two half-bridge inverters connected in parallel and which have two bridge legs in common.

In the inverter illustrated in FIG. 1, power from direct current source 10 is converted to alternating current to be delivered to load 11. The power is supplied from the positive terminal of source 10 through power switch 12 to the collector electrode of switching transistor 13. The emitter electrode of transistor 13 is in turn connected to the collector electrode of switching transistor 14, and the emitter electrode of transistor 14 is then returned through filter choke 15 to the negative terminal of source 10. Switching transistors 13 and 14 are both n-p-n transistors. The serially connected emitter-collector paths of transistors 13 and 14 are paralleled by the series combination of capacitors 16 and 17, where one terminal of capacitor 16 is connected to the collector electrode of transistor 13 and one terminal of capacitor 17 is connected to the emitter electrode of transistor 14, and where capacitors 16 and 17 have their respective other terminal connected together. The capacitances of capacitors 16 and 17 are chosen to be very large, so that the capacitors present substantially short circuits at the operating frequency of the inverter. Resistors 18 and 19 are connected in parallel with capacitors 16 and 17, respectively, to establish equal voltage division across capacitors 16 and 17 and to provide capacitor discharge paths when power is disconnected from the inverter.

The alternating current output power of the inverter is coupled to load 11 through output transformer 20 which has one terminal of its primary winding 20–1 connected to the junction of capacitors 16 and 17 and the other terminal connected through coupling capacitor 21 to the junction of the emitter electrode of transistor 13 and the collector electrode of transistor 14. The output power circuit is completed through secondary winding 20–2 which has its terminals connected to load 11.

Positive feedback to maintain the switching operation is obtained from the inverter output through feedback winding 20–3 of output transformer 20. The feedback is coupled through winding 20–3 to a tuned circuit comprising in combination the serially connected winding 20–3, capacitor 22, winding 23–1 of synchronization coupling transformer 23, and primary winding 24–1 of drive transformer 24. That is, one terminal of winding 20–3 is connected to one terminal of capacitor 22, the other terminal of capacitor 22 is connected to one terminal of winding 23–1, and the other terminal of winding 23–1 is returned through primary winding 24–1 to the other terminal of winding 20–3.

Synchronization coupling transformer 23 serves one of two distinct purposes. It is used either to couple a synchronization signal from the tuned circuit to other inverters operating in synchronism with the illustrated inverter or it may be used to accept a synchronization signal from external inverters to synchronize the switching frequency of the illustrated inverter. Transformer 23 also incorporates an adjustable inductance which is variable to tune the tank circuit, thereby controlling the switching frequency of the inverter.

Drive energy for switching transistors 13 and 14 is derived from the tuned circuit through drive windings 24–2 and 24–3, respectively, of drive transformer 24. Windings 24–2 and 24–3 have one of their terminals connected to the base electrode and the other terminal connected to the emitter electrode of transistors 13 and 14, respectively.

The symmetry correction signal of the present invention comprises two separate correction components as illustrated in lines A and B of FIG. 2. One correction component is generated through the effects of saturable core inductor 25 and auxiliary winding 24–4 of drive transformer 24 which are connected in series between the juncture of capacitors 16 and 17 and the juncture of transistors 13 and 14, respectively. The second component of the symmetry correction signal, on the other hand, is supplied through the series combination of resistor 26 and capacitor 27 which is connected between the juncture of transistors 13 and 14 and the juncture of one terminal of winding 20–3 and one terminal of winding 24–1.

Before power is applied to the inverter, capacitors 16 and 17 are discharged through resistors 18 and 19 and transistors 13 and 14 are nonconducting. When power switch 12 is closed to apply power from source 10, capacitors 16 and 17 immediately start to charge to the source voltage through choke 15. As a result of this charging current together with an initial circuit unbalance between the switching transistors, for instance, one of the transistors conducts, thereby starting the switching operations of the inverter. An output is therefore coupled into primary winding 20–1 and through feedback winding 20–3 into the tank circuit. These feedback signals, in turn, induce oscillations in the tank circuit, thereby coupling drive signals into secondary windings 24–2 and 24–3 to re-enforce the switching operations of the transistors. That is, primary winding 24–1 is inductively coupled to secondary windings 24–2 and 24–3 with a polarity as indicated by the dots in the drawing. A starting current entering winding 24–1 on its dot side, for instance, induces in-phase currents on the dot sides of windings 24–2 and 24–3, respectively. As a result of such a drive input to the dot side of primary winding 24–1 a voltage is therefore induced in winding 24–3 which cuts off transistor 14 and a voltage is induced in winding 24–2 which forward biases the base-emitter junction of transistor 13, thereby causing transistor 13 to conduct.

With transistor 13 conducting as a result of this drive input through primary winding 24–1, power from direct current source 10 flows from its positive terminal through switch 12, through the collector-emitter path of transistor 13, capacitor 21, winding 20–1, capacitor 17, and through choke 15 back to the negative terminal of source 10. The resulting current pulse through winding 20–1, in addition to being coupled through winding 20–2 to load 11, is also inductively coupled through winding 20–3 into the tank circuit as positive feedback to maintain oscillations in the tank circuit at a frequency which is primarily determined by the capacitance of capacitor 22 and the inductance of transformer 23.

During the initial half-cycle of oscillation in the tank circuit the output coupled from the tank circuit supported the conduction of transistor 13 while cutting off transistor 14. In the next succeeding half-cycle, on the other hand, the polarity of the oscillations in the tank circuit reverses, so that the voltage induced in feedback winding 24–2 cuts off transistor 13, while the voltage induced in feedback winding 24–3 forward biases the base-emitter junction of transistor 14, thereby causing transistor 14 to conduct instead. During the conduction of transistor 14, power is supplied from direct current source 10 through switch 12, capacitor 16, primary winding 20–1, capacitor 21, the collector-emitter path of transistor 14, and through choke 15 back to the negative terminal of source 10. In alternating half-cycles transistors 13 and 14 are therefore rendered alternately conductive, thereby repeating the respective conduction cycles and generating alternating current power for the load.

During the operation of the inverter, the basic drive signal for the switching transistors is derived from the tank circuit by coupling the oscillations through windings 24–2 and 24–3 to the base-emitter circuits of the transistors, thereby controlling the alternate conduction of transistors 13 and 14. The resulting output waveform of the inverter should, under ideal operating conditions, be directly in phase with the drive signal and take the form of a perfectly symmetrical square wave. Due to inherent component and circuit characteristics, however, the output waveform is generally not a perfect square wave, but takes the form of an asymmetrical, rectangular wave. More specifically, such asymmetrical waveform may be caused, for instance, because of different turn-on and turn-off times of the switching transistors or because of a difference in transistor storage time or saturation voltage.

In the operation of the inverter it is generally desired that the output waveform be symmetrical; that is, it should as nearly as possible represent a square wave. This requirement is particularly important in high power applications, where the least degree of asymmetry has a detrimental effect on the overall efficiency of the inverter. A further distinct disadvantage resulting from such asymmetrical operation is the required increase in switching transistor power rating because of the additional power dissipation in the transistors.

The inverter illustrated in FIG. 1 includes symmetry correction circuitry to assure a symmetrical output waveform, thereby overcoming the inherent disadvantages resulting from asymmetrical inverter operation. The symmetry correction circuitry of the present invention comprises two separate aspects of correction. A saturable inductor 25 is connected in series with auxiliary winding 24-4 between point 30, the juncture of transistors 13 and 14, and point 31, the juncture of capacitors 16 and 17, to generate the basic symmetry correction signal which is based on the difference in average voltage between points 30 and 31. The series combination of resistor 26 and capacitor 27 connected between point 30 and the juncture of windings 20-3 and 24-1, on the other hand, adds an additional correction component to assure the required duration of the composite correction signal.

When during the operation of the inverter the output waveform is symmetrical, the average voltage at point 30 is equal to the average voltage at point 31. As a result no difference in average voltage exists between points 30 and 31, so that inductor 25 and winding 24-4 are rendered effectively inactive during symmetrical operation of the inverter.

When the output waveform becomes asymmetrical, on the other hand, the average voltages at points 30 and 31 are no longer equal because of the difference in duration of the alternating cycles of the output waveform. Consequently, a difference in average voltage exists between points 30 and 31 during each half-cycle of the asymmetrical output which is effectively impressed across the series combination of inductor 25 and winding 24-4. Inductor 25, however, is of the saturable core type; that is, it is designed to have a predetermined volt-second characteristic which, when exceeded, causes current to flow through the inductor to generate the symmetry correction signal.

Because of the asymmetrical operation of the inverter, the average voltage at point 30 may go up, for instance, so that the average voltages, and therefore the volt-second areas, at points 30 and 31 are proportionally different. This volt-second difference, however, is impressed across inductor 25 causing it to saturate at some time during the specific cycle, where the time of saturation is proportional to the volt-second difference. As a result current flows during the saturation period through inductor 25 and winding 24-4, since winding 24-4 is connected in series with saturable core inductor 25. The current through winding 24-4, in turn, couples a signal into drive windings 24-2 and 24-3, the polarity of which is such that it provides for the proper correction of the pulse duration by controlling the conduction period of switching transistors 13 and 14.

In the operation of the inverter it may, for instance, occur that transistor 13 conducts for a longer period than transistor 14, thereby generating an asymmetrical output waveform. It is apparent that a correction signal which is generated through the action of inductor 25 in cooperation with winding 24-4 should be of such polarity as to shorten the conduction period of transistor 13, while it should increase the conduction period of transistor 14. That is, the symmetry correction signal which is generated by the action of inductor 25 must necessarily be of such polarity as to reduce the asymmetry of the output waveform which originally caused the generation of the correction signal. The series connection of inductor 25 with winding 24-4, with its polarity as indicated in FIG. 1, assures that a proper polarity correction signal is induced into the drive windings of the transistors.

When, for instance, the duration of the conduction period is longer for transistor 13 than for transistor 14, the average voltage at point 30 will be greater than the average voltage at point 31. In order to restore the symmetry of the output waveform a symmetry correction signal must therefore be supplied which tends to shorten the conduction period of transistor 13, while lengthening the conduction period of transistor 14. Because of the higher average potential at point 30 with respect to point 31 a current is induced through inductors 25 and winding 24-4 from point 30 to point 31 which enters winding 24-4 on the side opposite to its dot side. This current through winding 24-4, in turn, induces voltages in windings 24-2 and 24-3 which are related to the voltages in winding 24-4 by the polarity dots as indicated on the windings. That is, a pulse is induced in winding 24-2 which tends to turn off transistor 13, thereby causing transistor 13 to cease conduction. The pulse induced in winding 24-3, however, is of the opposite polarity, thereby causing transistor 14 to start conduction.

The combined action of the correction signals as applied to the base-emitter circuits of transistors 13 and 14 therefore tends to correct the asymmetrical output waveform by shortening the conduction period of transistor 13, while lengthening the conduction of transistor 14, thereby tending to re-establish the symmetrical output waveform of the inverter.

In the next following cycle of the operation of the inverter the asymmetry has been reduced by the amount of the correction that had been provided for in the previous cycle. The difference in average voltage, and therefore the volt-second area difference, between points 30 and 31 has consequently decreasesd, thereby decreasing the duration of the next following correction signal. Over the period of several cycles a complete correction will have been obtained because of the automatic correction capability of the circuit, so that the symmetry of the output waveform of the inverter will be restored.

In certain applications the phase of the output waveform may be displaced from the phase of the tank circuit oscillations to such a degree, however, that the correction signal which is obtained through the cooperation of inductor 25 and winding 24-4 is not sufficient by itself to provide for a complete symmetry correction. In the inverter of the present invention the basic inverter drive signal is derived from the tuned tank circuit, so that the tank circuit oscillations determine the operating frequency of the inverter. This sinusoidal drive signal which is derived from the tank circuit is itself unaffected by and quite independent of the symmetry correction signal. Since, however, the correction signal is used only to modify the conduction period of the switching transistors during the actual saturation period of the inductor, it may be readily understood that the correction component which is generated by inductor 25 may not have a sufficient duration, where the phase imbalance between the output waveform and the sinusoidal drive signal is greater than the duration of the correction signal.

When, for instance, the phase imbalance between the output waveform and the sinusoidal drive signal is such that saturation of inductor 25 occurs during the conduction cycle of the sinusoidal drive signal at 120°, for instance, and the correction signal duration is only 20°, then at 140°, that is, at 120° plus 20°, the sinusoidal drive signal prevails again until it crosses through zero at 180°. For the period from 140° to 180° the drive signal, therefore, tends to re-establish the original transistor conduction of the particular half-cycle, thereby frustrating the symmetry correction attempt.

An additional correction network comprising the series combination of resistor 26 and capacitor 27 is, therefore, connected between point 30 and the juncture of windings 20-3 and 24-1 to extend the duration of the composite correction signal. That is, resistor 26 and capacitor 27 effectively differentiate the output waveform which is generated at the time when the original correction signal ceases. This differentiated output signal is added on and follows the correction signal generated by inductor 25 and is coupled through primary winding 24–1 into the base-emitter drive circuits of transistors 13 and 14 and through their respective drive windings 24–2 and 24–3. The two separate components of the correction signal and the composite correction signal as related to the sinusoidal drive signals are illustrated in FIG. 2, lines A through D. That is, the complete symmetry correction signal comprises a first component, illustrated in line A of FIG. 2, which is generated by inductor 25 in conjunction with winding 24–4, and a second component, shown in line B of FIG. 2, which is an exponentially decreasing correction signal derived from the series combination of resistor 26 and capacitor 27. The combination of these two correction signal components as shown in line D of FIG. 2 assures that the composite correction signal is of the proper duration and that proper symmetry correction takes place even though a large phase difference exists between the tank circuit oscillations shown in line C of FIG. 2 and the output waveform of the inverter.

Another embodiment of the invention is shown in FIG. 3, where a second half-bridge inverter is connected in parallel with half-bridge inverter arrangement as illustrated in FIG. 1. In the inverter arrangement of FIG. 3 all of the components which are identical to those of FIG. 1 have been given the same numerical designation. The emitter-collector paths of transistors 32 and 33 are serially connected across capacitors 16 and 17 to form two legs of the second half-bridge, where the second bridge shares capacitors 16 and 17 with the first half-bridge inverter. The first half-bridge inverter is used as a free running inverter to drive the power stage comprising transistors 32 and 33 which, in turn, supply load 11 through output transformer 34. Output transformer 34 is connected to the output diagonals 31 and 35 of the bridge which are formed by the junctures of capacitors 16 and 17 and transistors 32 and 33, respectively. The drive signal for transistors 32 and 33 is obtained through windings 20–4 and 20–5, respectively, from the output of the first half-bridge inverter.

The operation of the inverter of FIG. 3 is in principle identical to the operation of the inverter of FIG. 1, although it utilizes 2 half-bridge inverters. The half-bridge inverter comprising transistors 13 and 14 is used as a free running inverter to generate the drive signal for the power stage comprising transistors 32 and 33. Transistors 13 and 32 and transistors 14 and 33 operate in synchronism, respectively; that is, the respective transistor pairs alternately conduct together and are alternately turned off together. An alternating output current is therefore delivered to load 11 through output transformer 34, where the current in one-half cycle is supplied from the negative terminal of source 10 through inductor 15, the emitter-collector path of transistor 32, the primary winding of transformer 34, capacitor 16, and through switch 12 back to the positive terminal of source 10, and where current is supplied in the following half-cycle from the positive terminal of source 10, through switch 12, the collector-emitter path of transistor 33, the primary winding of transformer 34, capacitor 17, and through inductor 15 back to the negative terminal of source 10.

In the operation of the inverter of FIG. 3, it is evident that an asymmetric output waveform will cause a difference in average voltage between points 30 and 31 of the bridge. In the circuit of FIG. 3, however, capacitors 16 and 17 also carry the output current of power transistors 32 and 33, so that the voltage imbalance between points 30 and 31 is now, in addition to being proportional to the voltage imbalance caused by the first half-bridge inverter, also proportional to the voltage imbalance caused by the asymmetry of the output waveform of the second half-bridge inverter. Since inductor 25 now senses the total voltage imbalance which is due to the combined action of the two bridge currents, the sensitivity of the symmetry correction arrangement has, as a result, been increased. The corrective action which takes place in the circuit of FIG. 3 as a result of the voltage imbalance between points 30 and 31 is identical to the reaction of the circuit of FIG. 1. That is, correction signals as illustrated in FIG. 2 are being generated in response to the asymmetrical output waveform and the consequent voltage imbalance across points 30 and 31, thereby tending to re-establish symmetrical operation of the inverter.

A distinct feature of the circuit of FIG. 3 is the increased sensitivity which is realized because of the response to the voltage imbalance caused by the asymmetry of both bridges. Besides the general benefits which result from the symmetrical operation of the inverter, the present invention as embodied in FIGS. 1 and 2 features another important advantage; that is, all of the correction action takes place in the low power base-emitter drive circuits of the inverter, thereby achieving the symmetry correction without requiring extensive additional power.

It is to be understood that the above-described arrangement is illustrative of the application of the principles of the invention. Numerous other arrangements may be devised by those skilled in the art without departing from the spirit and scope of the invention.

What is claimed is:

1. An inverter which comprises a source of direct input current, a pair of switching transistors each having an emitter electrode, a collector electrode, and a base electrode, a pair of capacitors, the emitter-collector paths of said transistors being connected in series to form two adjacent arms of a four-terminal bridge and said capacitors being connected in series to form the remaining two arms of the same bridge, a load coupled across a first diagonal of said bridge formed by the juncture between said transistors and the juncture between said capacitors to receive current in one direction from one of said transistors and in the opposite direction from the other of said transistors, said source being connected across the other diagonal of said bridge, reference means connected across said source and to the juncture of said capacitor to establish a reference voltage at the juncture of said capacitor, feedback means connected to provide regenerative feedback between the emitter-collector path and the emitter-base path of respective transistors to render the emitter-collector paths of said transistors alternately conducting and substantially nonconducting in phase opposition to one another, said feedback means including at least one transformer having a primary winding coupled to the emitter-collector paths of said transistors and having one of a plurality of secondary windings connected to each one of a respective emitter-base path of said transistors, a saturable core inductor, and said transformer having in addition an auxiliary winding connected in series with said saturable core inductor between the juncture of said transistors and the juncture of said capacitors to generate a feedback signal proportional to the voltage unbalance between the juncture of said transistors and said capacitors, respectively, thereby providing for a symmetrical output waveform of said inverter.

2. An inverter in accordance with claim 1 which includes in addition a resistor and a capacitor connected in series between said transformer primary winding and the juncture of said transistors to aid in the production of a symmetrical output waveform.

3. An inverter in accordance with claim 2 in which said load includes an output transformer having its primary winding coupled to the first diagonal of said bridge and having its secondary winding connected to said load, and in which said feedback means includes a tank circuit to determine the switching frequency of said inverter.

4. An inverter which comprises a source of direct input current, a first and a second transistor each having an emitter electrode, a base electrode and a collector electrode, a first and a second capacitor, the emitter electrode of said first transistor being connected to the collector electrode of said second transistor to form two adjacent arms of a four-terminal bridge and said capacitors being connected in series to form the remaining two arms of the same bridge, a third capacitor, a coupling transformer having a plurality of secondary windings and having a primary winding connected in series with said third capacitor across the diagonal of said bridge formed by the juncture between said transistors and the juncture between said capacitors, a utilization circuit coupled to at least one of said secondary windings of said coupling transformer, feedback means coupled to one of said secondary windings of said coupling transformer to provide regenerative feedback between the emitter-collector paths and the base-emitter paths of respective transistors to render the emitter-collector paths of said transistors alternately conducting and substantially nonconducting in phase opposition to one another, thereby supplying current from said source to said utilization circuit in one direction from one of said transistors and in the opposite direction from the other of said transistors, said feedback means including a tank circuit to determine the switching frequency of said inverter and at least one feedback transformer having a primary winding coupled to said tank circuit and having one each of a plurality of its secondary windings connected to one each of a respective base-emitter path of said transistors, and a symmetry correction circuit comprising the combination of a saturable core inductor and an auxiliary winding on said feedback transformer connected in series between the juncture of said transistors and the juncture of said capacitors to generate a feedback signal proportional to the voltage unbalance between said junctures, and a resistor and a capacitor connected in series between said feedback transformer primary winding and the juncture of said transistors, thereby maintaining the output wave form of said inverter symmetrical.

5. An inverter in accordance with claim 4 in which such utilization circuit comprises a third and a fourth transistor each having an emitter electrode, a base electrode, and a collector electrode, and having their serially connected emitter-collector paths connected in parallel across said serially connected first and second capacitors, thereby forming a second bridge circuit having said third and fourth transistors as two adjacent bridge arms and utilizing as the other two bridge arms the two arms of said first bridge circuit which comprise said first and second capacitors, a load circuit connected across the diagonal of said second bridge circuit formed by the juncture between said third and fourth transistors and the juncture between said first and second capacitors, and each of the emitter-base paths of said third and fourth transistors being coupled to one of said coupling transformers secondary windings to render the emitter-collector paths of said third and fourth transistors alternately conducting and substantially nonconducting in phase opposition to one another and in synchronism with said first and second transistors, respectively, to supply current from said source to said load in one direction through the emitter-collector path of said third transistor and the capacitor in the opposite arm of said bridge, and in the opposite direction through said fourth transistor and the capacitor in the respective opposite arm of said bridge, thereby increasing the effectiveness of the symmetry correction arrangement.

References Cited
UNITED STATES PATENTS

| | | | |
|---|---|---|---|
| 2,965,856 | 12/1960 | Roesel | 331—113 |
| 3,109,133 | 10/1963 | Mills | 321—45 XR |
| 3,260,963 | 7/1966 | Relation et al. | 331—113 |
| 3,295,043 | 12/1966 | Massey | 321—18 XR |

JOHN F. COUCH, *Primary Examiner.*

W. M. SHOOP, *Assistant Examiner.*